United States Patent
Yusuf et al.

(10) Patent No.: US 10,288,461 B2
(45) Date of Patent: May 14, 2019

(54) PIEZOELECTRIC CABLE FLOW SENSOR

(71) Applicant: Mueller International, LLC, Atlanta, GA (US)

(72) Inventors: Shabbir Yusuf, Mississauga (CA); Werner Guenther Richarz, Thornhill (CA); Daryl Lee Gibson, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 206 days.

(21) Appl. No.: 15/056,377

(22) Filed: Feb. 29, 2016

(65) Prior Publication Data
US 2017/0248458 A1 Aug. 31, 2017

(51) Int. Cl.
*G01F 1/66* (2006.01)
*G01F 1/20* (2006.01)

(52) U.S. Cl.
CPC .............. *G01F 1/662* (2013.01); *G01F 1/20* (2013.01)

(58) Field of Classification Search
CPC ....................................................... G01F 15/14
USPC ......................................................... 310/329
See application file for complete search history.

(56) References Cited

U.S. PATENT DOCUMENTS

| | | | | |
|---|---|---|---|---|
| 3,557,616 A * | 1/1971 | Landon, Jr. et al. | ...... | G01F 1/30 310/328 |
| 4,559,832 A * | 12/1985 | Burlage | ................ | G01F 1/3254 310/338 |
| 4,719,806 A * | 1/1988 | Craigen | .................... | G01F 1/46 73/861.42 |
| 5,117,687 A * | 6/1992 | Gerardi | .................... | G01L 5/161 73/170.15 |
| 5,627,322 A * | 5/1997 | Osterloh | ............... | G01F 1/3263 73/861.21 |
| 2009/0021117 A1* | 1/2009 | Ueda | ...................... | G01H 11/08 310/329 |

OTHER PUBLICATIONS

Specification sheet for Piezo Coplymer Coaxial Cable, Measurement Specialties, located at www. meas-spec.com, dated Aug. 15, 2011, 2 pgs.*
Specification sheet for Piezo Spiral Wrapped Coaxial Cable, Measurement Specialties, located at www. meas-spec.com, dated Aug. 15, 2011, 2 pgs.*
Specification sheet for Piezo Copolymer Coaxial Cable, Measurement Specialties. located at www.meas-spec.com, dated Aug. 15, 2011, 2 pgs.

* cited by examiner

*Primary Examiner* — Nathaniel T Woodward
(74) *Attorney, Agent, or Firm* — Taylor English Duma LLP (57) ABSTRACT

A flow sensor for a pipe includes a housing defining an interior chamber; a mounting adapter that is circumferentially coupled to an open proximal end of the housing; and a piezoelectric cable that at least partially extends within the interior chamber of the housing. The piezoelectric cable includes a piezoelectric material.

27 Claims, 7 Drawing Sheets

Measured response spectra at selected pump RPM

FIG. 7A

Overall output level as a function of pump RPM

FIG. 7B

Band-limited RMS as a function of low-pass corner frequency $f_c$

PIEZOELECTRIC CABLE FLOW SENSOR

BACKGROUND

Field

This application relates generally to flow sensors. More particularly, embodiments of the subject matter relate to flow sensors for placement across a flow path in a fluid distribution system.

Background Technology

Flow sensors can detect the rate of flow of fluid in a closed system such as water in a pipe system. Many flow sensors are unusable or undesirable in certain systems, such as potable water distribution systems, because of the material compositions and other characteristics of the sensor. Pipe systems are also subject to leaks and pipe bursts that can be difficult to detect and locate and can cause significant damage to the system and surrounding property, as well as significant interruptions in service to downstream users, if not located and fixed quickly.

It is desirable to have flow sensor or sensors that are configurable for placement across a flow path in a fluid distribution system to timely indicate if a pipe leak or failure has occurred to minimize collateral damage. Furthermore, other desirable features and characteristics will become apparent from the subsequent detailed description and the appended claims, taken in conjunction with the accompanying drawings and the foregoing technical field and background.

SUMMARY

Described herein is a flow sensor and a method of fluid flow in a pipe system. In one aspect, the flow sensor is configurable for insertion into a pipe and can comprise a housing defining an interior chamber; a mounting adapter circumferentially coupled to an open proximal end of the housing; and a piezoelectric cable. In a further aspect, the piezoelectric cable can comprise at least one of an inner conductive layer, a piezoelectric material layer that can at least partially circumferentially surround and contact the inner conductive layer, and an outer conductive layer that can at least partially circumferentially surround and contact the piezoelectric material layer. It is contemplated that a distal portion of the piezoelectric cable can extend within the interior chamber of the housing.

In another aspect, the method for detecting fluid flow in a pipe forming a portion of a pipe system can comprise inserting at least a portion of the flow sensor into the interior cavity of the pipe; positioning a portion of a housing of the flow sensor across a flow path of a fluid within the interior cavity of the pipe; vibrating the flow sensor with fluid flow impacting at least a portion of a housing of the flow sensor within the pipe system; and measuring an output from the flow sensor, the output comprising, for example and without limitation, a charge or a voltage.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present invention can be understood more readily by reference to the following detailed description, examples, drawings, and claims, and the previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a resistor" can include two or more such resistors unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or Steps are included or are to be performed in any particular embodiment.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

In one aspect, disclosed is a flow sensor and associated methods, systems, devices, and various apparatus. The flow sensor comprises a housing and a piezoelectric cable. It would be understood by one of skill in the art that the disclosed flow sensor is described in but a few exemplary embodiments among many. No particular terminology or description should be considered limiting on the disclosure or the scope of any claims issuing therefrom.

Figure 1:
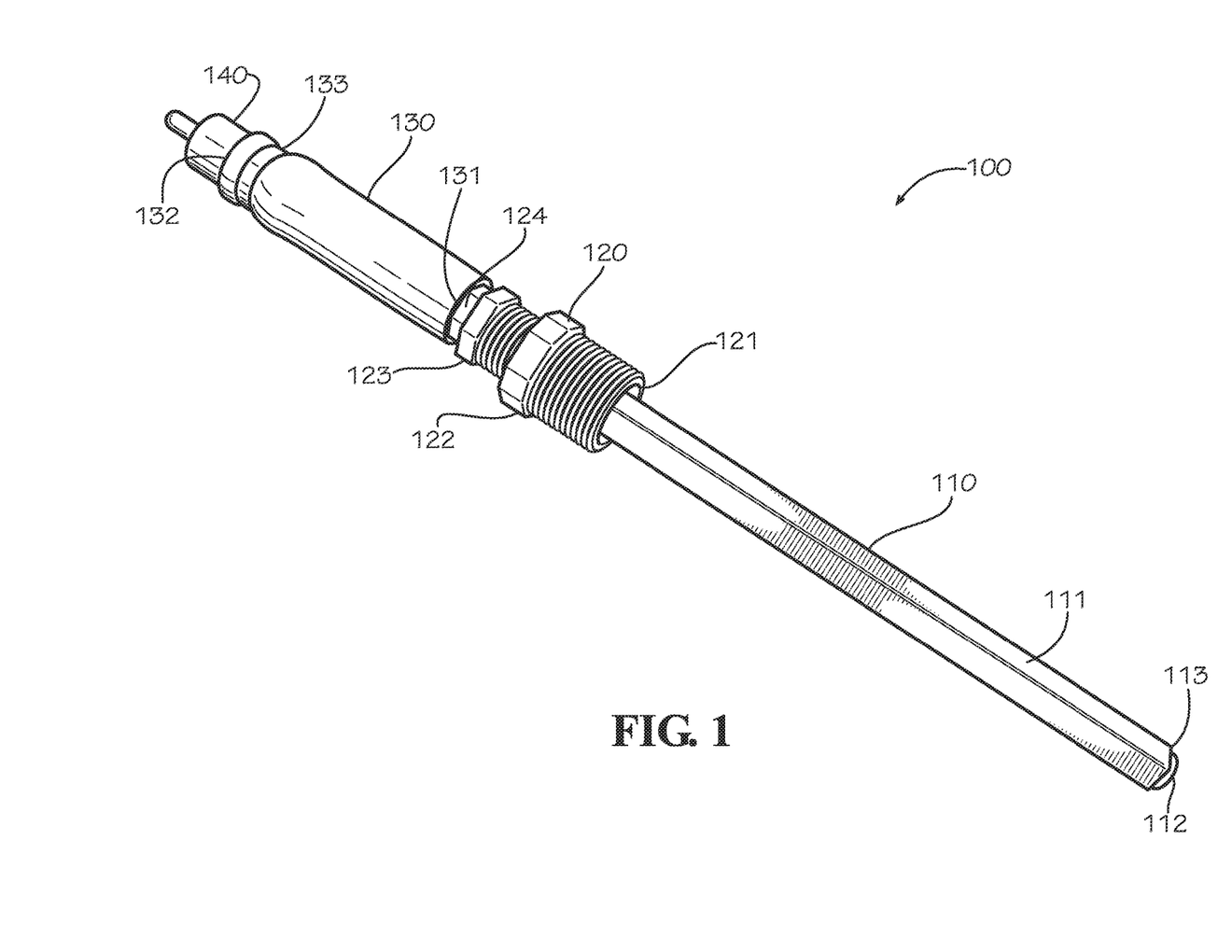
FIG. 1 is a perspective view of a flow sensor in accordance with one aspect of the present disclosure.

An exemplary flow sensor 100 is illustrated in FIG. 1. In one aspect, the flow sensor 100 can comprise an elongated external member 110, a piezoelectric cable 200 (shown in FIG. 2), a cylindrical tube 210 (shown in FIG. 2), a mounting adapter 120, a stiffening sleeve 130, and an RCA connector 140. In a further aspect, the external member 110 can define an elongated interior void that is configured or otherwise sized and shaped to operatively receive and house the cylindrical tube 210 and a distal portion 201 (shown in FIG. 2) of the piezoelectric cable 200. It is contemplated that the external member 110 can be circumferentially coupled to an open proximal end 121 of the mounting adapter 120 by, for example and without limitation, welding, press-fitting, epoxy or other adhesive, a threaded connection being formed integrally with a portion of the mounting adapter, or any other like mechanism for connection.

In one aspect, the external member 110 can define an outer surface 111 that defines a rectangular cross-section relative to a longitudinal axis of the external member. In one aspect, the rectangular cross-section can be a square cross-section. Optionally, it is contemplated that the outer surface 111 can define other uniform geometric cross-sections in various other aspects, including but not limited to circular, triangular, pentagonal, hexagonal, octagonal cross-sections and the like, and can comprise any number and combination of flat and curved sides. In another aspect, at least a portion of the outer surface 111 can optionally be textured or roughened, such as by hand with sandpaper or machining, to increase a drag coefficient of fluid flow across the outer surface 111. In this aspect, the external member can also comprise an endcap 112 at a distal end 113, which is configured to close the distal end 113 of the external member 110. Optionally, the distal end 113 can be closed by epoxy or any other filling, having a preformed end formed integrally with the external member 110, crimping the distal end 113, or any other like mechanism suitable for closing the distal end 113.

Figure 2:
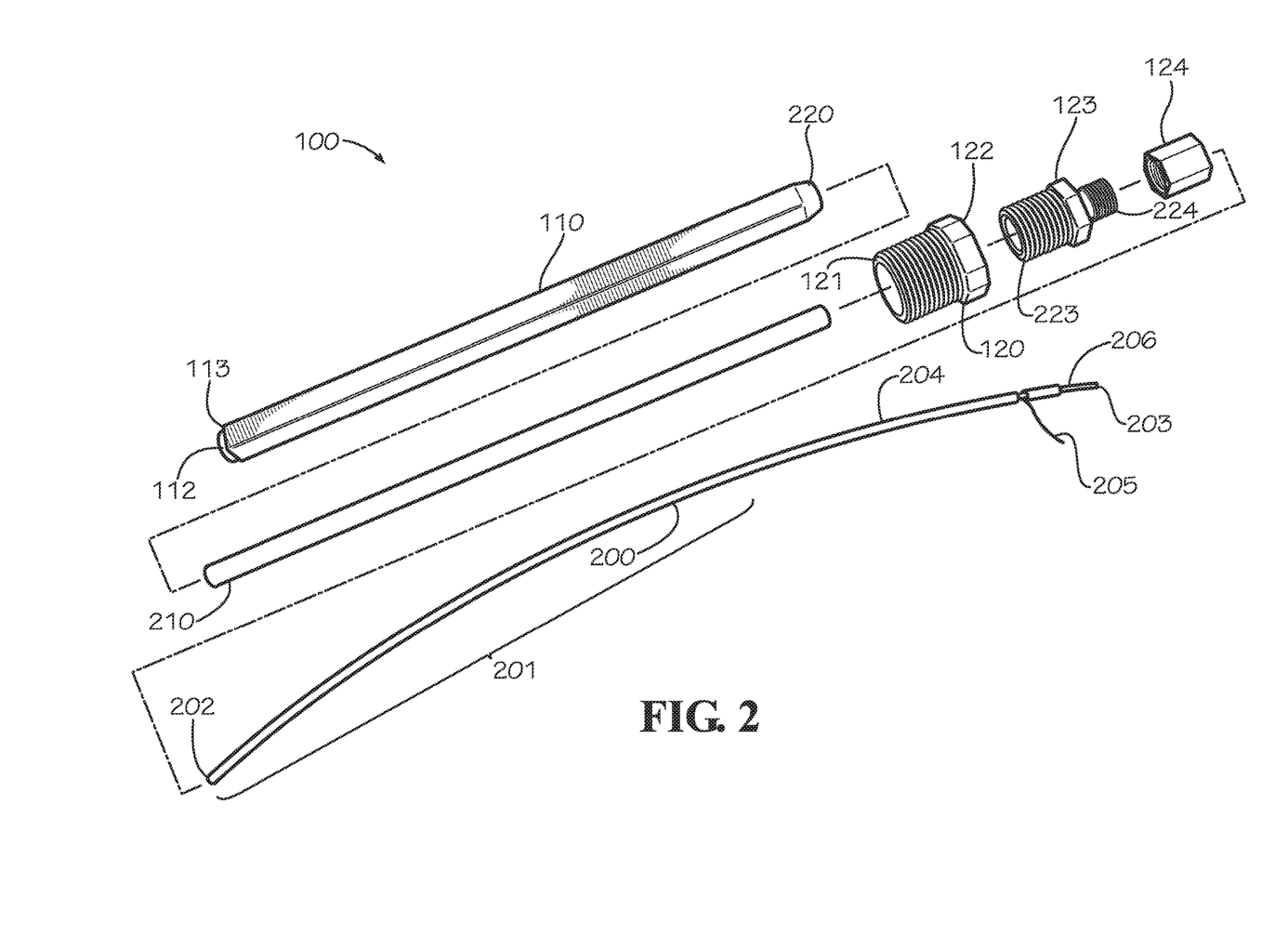
FIG. 2 is an exploded perspective view of the flow sensor of FIG. 1.

In another aspect, the mounting adapter 120 can comprise a hex bushing 122, a reducing hex nipple 123, and a coupling nut 124. In this aspect, the reducing hex nipple 123 can be configurable to couple the hex bushing 122 to the coupling nut 124. The hex bushing 122 defines the open proximal end 121, and the hex bushing 122, the reducing hex nipple 123, and the coupling nut 124 in combination define a substantially co-axial passage configured or otherwise sized and shaped to receive the piezoelectric cable 200 that is configured to pass through the mounting adapter 120. Optionally, it is contemplated that the mounting adapter 120 can be any mechanisms or combination of mechanisms, with hex or non-hex features, that allow the flow sensor 100 to mount on a pipe wall saddle 310 (shown in FIG. 3) or otherwise mounted on a pipe 300 (shown in FIG. 3).

In one aspect, the stiffening sleeve 130 can extend from the mounting adapter 120 to the RCA connector 140. In this aspect, a first end 131 of the stiffening sleeve 130 can be circumferentially coupled to the coupling nut 124 and a second end 132 of the stiffening sleeve 130 can be circumferentially coupled to the RCA connector 140 by a band 133. In this aspect, it is contemplated that the first end 131 can be circumferentially coupled to the coupling nut 124 and the second end 132 can be circumferentially coupled to the RCA connector 140 by any other mechanisms in other aspects, including, but not limited to, heat-shrinking, adhesives, hose clamps, interference fits, or other bands.

FIG. 2 shows an exploded view of the flow sensor 100 with the stiffening sleeve 130 and the RCA connector 140 removed. In one aspect, the external member 110 can further comprise a tapered distal end 220 that is configured to hold the tube 210 within the external member 110. However, optionally, it is contemplated that the distal end 220 need not be tapered in other aspects.

In one aspect, the tube 210 can exemplarily comprise acetal homopolymer, such as sold under the trade name Delrin®, though the tube 210 can comprise other materials in other aspects, such as various metals, polymers and the like. In this aspect, the piezoelectric cable 200 is complementarily sized and shaped to extend through the mounting adapter 120 and to be received within the tube 210, which is also complementarily sized and shaped to be received within the external member 110. In one aspect, the tube 210 can be fully enclosed within the external member 110, with the tube 210 comprising a length substantially equal to a length of the external member 110, though, optionally, it is contemplated that the tube 210 can be longer or shorter than the external member 110 in other aspects.

In one aspect, the piezoelectric cable 200 is a coaxial cable and can comprise a distal end 202, a proximal end 203, a jacket 204, an outer conductive layer 205, and an inner conductive layer 206. The distal end 202 can be closed and covered by the jacket 204 or open. In one aspect, the proximal end 203 of the piezoelectric cable 200 can be configured to be coupled with the RCA connector 140. In this aspect, to exemplarily couple the proximal end 203 of the piezoelectric cable 200 with the RCA connector 140, a portion of the outer conductive layer 205 can be peeled away from the inner conductive layer 206 and separated from the inner conductive layer 206 with a portion of the jacket 204. Thus, in this exemplary aspect, the inner conductive layer 206 and the outer conductive layer 205 can thereby be coupled to the RCA connector 140 by soldering the layers 205,206 to respective connection portions of the RCA connector 140. Other connectors 140 can be used in other aspects, such as F connectors, banana plugs, or any other like mechanism for connecting the piezoelectric cable 200 to a measuring device.

Figure 4:
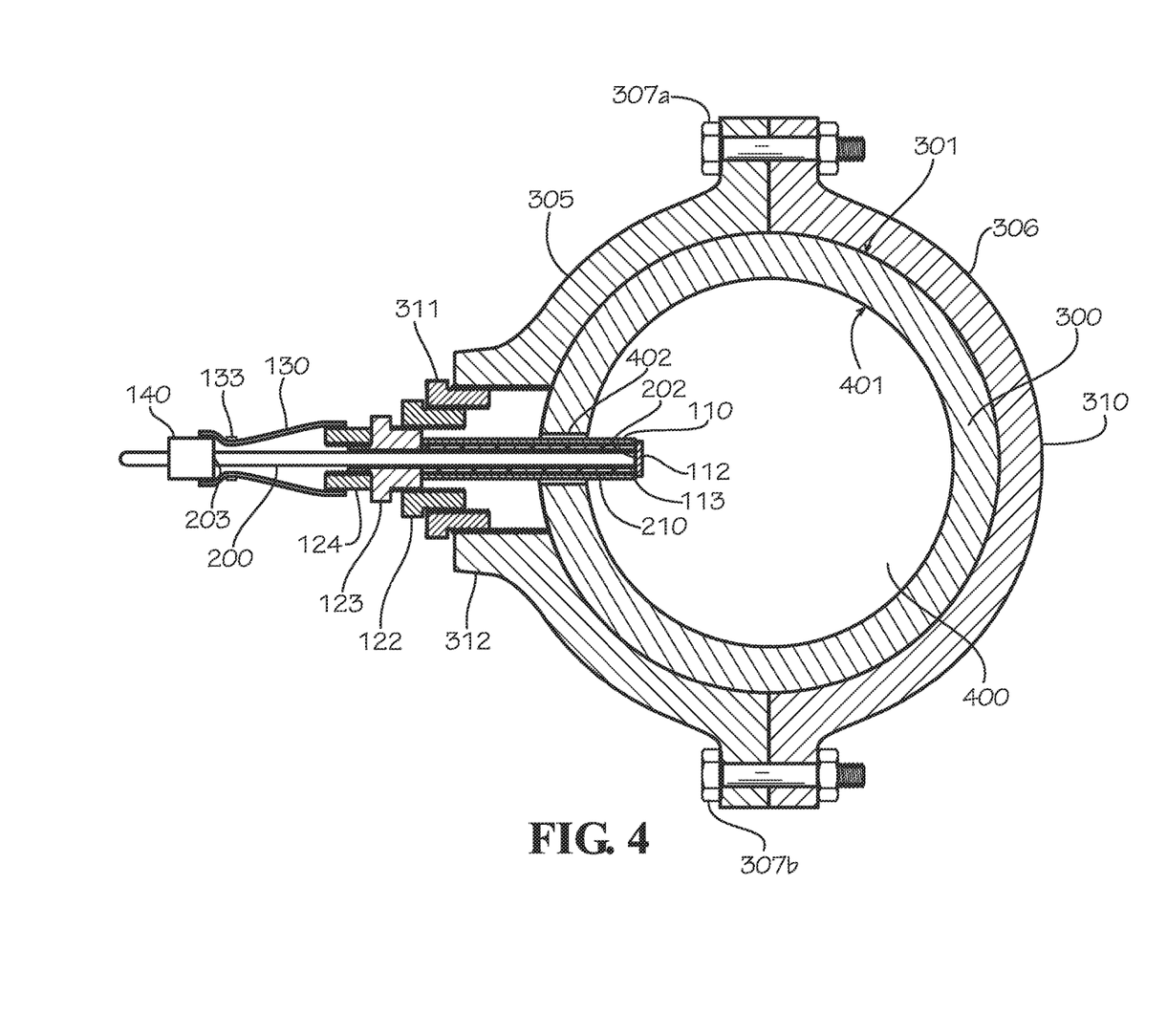
FIG. 4 is cross-sectional view of the flow sensor, pipe wall saddle, and pipe of FIG. 3 taken from line 4-4 in FIG. 3.

In another aspect, the coupling nut 124 can comprise internal threading for attachment to complementary external threading on a reduced end 224 of the reducing hex nipple 123, as shown in FIG. 4. Likewise, the hex bushing 122 can comprise internal threading for attachment to complementary external threading on an enlarged end 223 of the reducing hex nipple 123, as shown in FIG. 4.

Figure 3:
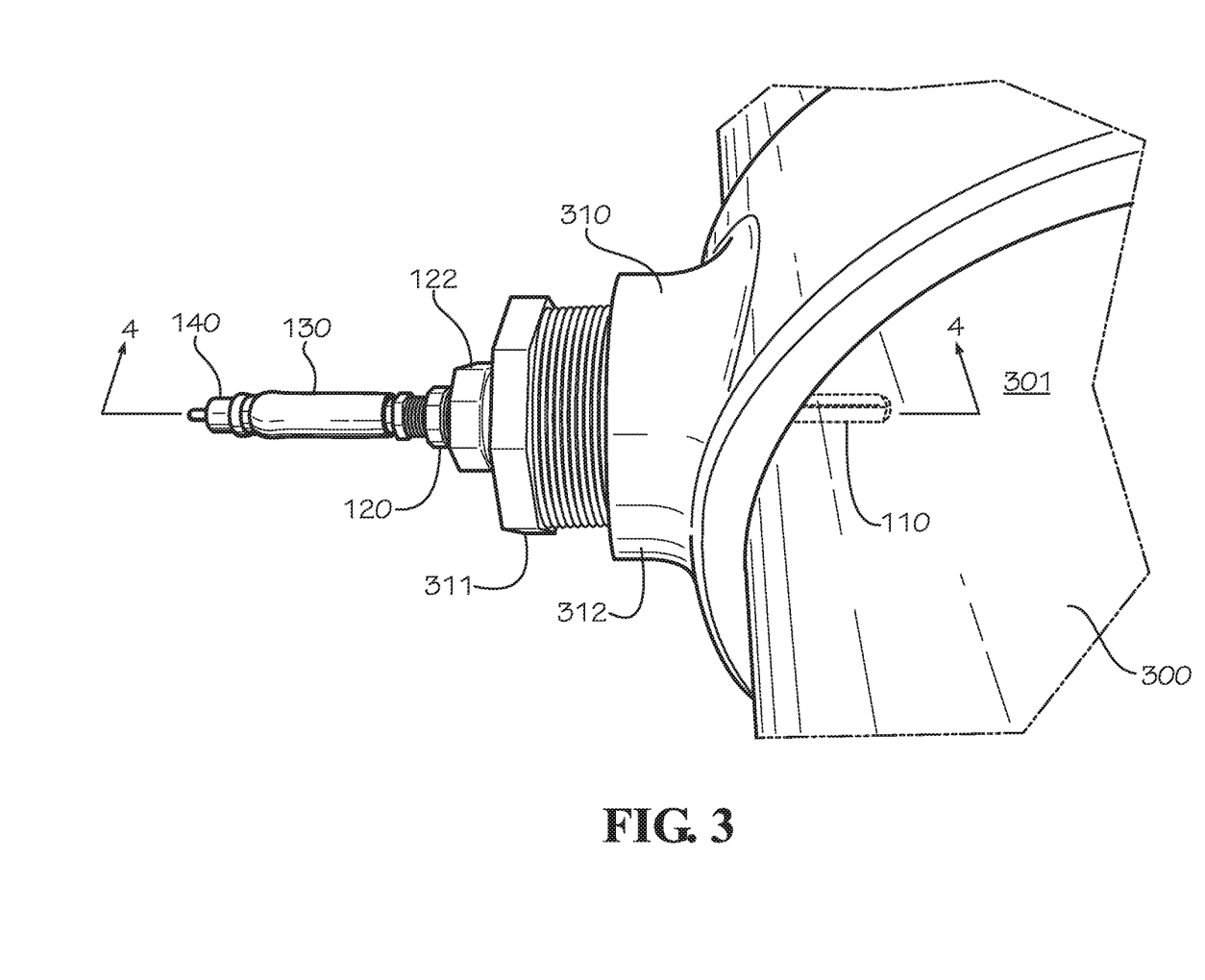
FIG. 3 is a perspective view of the flow sensor of FIG. 1 coupled to a pipe wall saddle mounted on a pipe with a portion of the flow sensor extending into the pipe.

Referring now to FIGS. 3 and 4, the flow sensor 100 is shown mounted on the pipe wall saddle 310. In one aspect, the pipe wall saddle 310 can be mounted on an exterior surface 301 of the pipe 300. In this aspect, it is contemplated that the external threading of the hex bushing 122 can be attached to complementary internal threading of a saddle hex bushing 311. Similarly, the saddle hex bushing 311 is attached to internal threading of a neck 312 of the pipe wall saddle 310. In this aspect, the neck 312 and the saddle hex bushing 311 can define bores therethrough that are aligned with a sensor hole 402 formed in the pipe 300. In one aspect, the sensor hole extends from the exterior surface 301 to an interior surface 401 of the pipe 300. In this aspect, attachment of the hex bushing 122 to the saddle hex bushing 311 extends a portion of the external member 110 through the saddle hex bushing 311, the neck 312, and the sensor hole 402.

FIG. 4 shows a cross-sectional view of the pipe 300, pipe wall saddle 310, and flow sensor 100 and illustrates a portion of each of the external member 110, the tube 210, and the piezoelectric cable 200 extending through the sensor hole 402 into an interior 400 of the pipe 300 into an operating position across a flow path of a fluid traveling through the pipe system in the interior 400 of the pipe 300. In one aspect, the portion of the external member 110 inserted into the interior 400 of the pipe 300 can be at least three inches long, though other aspects can have a length of three inches or less. In one aspect, the pipe wall saddle 310 can comprise a first saddle segment 305 and a second saddle segment 306 that are configured to be coupled together with nut-and-bolt fasteners 307a,b.

FIG. 4 also illustrates the piezoelectric cable 200 extending through the external member 110, tube 210, mounting adapter 120, and stiffening sleeve 130. In this aspect, the distal end 202 of the piezoelectric cable 200 is exemplarily positioned proximate to the distal end 113 of the external member 110 such that the piezoelectric cable 200 can extend into the interior 400 of the pipe 300 approximately the same distance as the external member 110. In a further aspect, the piezoelectric cable 200 can be embedded within an interior chamber of the tube 210 such that at least a portion of the piezoelectric cable 200 is positioned in contact with an inner surface of the tube 210 and is held fixedly in place relative to the tube 210. In this aspect, it is contemplated that the piezoelectric cable 200 will not move relative to the tube 210. Likewise, the tube 210 can be embedded within an interior chamber of the external member 110 such that at least a portion of the tube 210 contacts an inner surface of the external member 110 and is held fixedly in place relative to the external member 110. In this aspect, it is contemplated that the tube 210 consequently will not move relative to the external member 110. In other aspects, the tube 210 may not be present and the piezoelectric cable 200 can be embedded within the interior chamber of the external member 110 such that at least a portion of the piezoelectric cable 200 contacts an inner surface of the external member 110 and is held fixedly in place relative to the external member 110.

Figure 5:
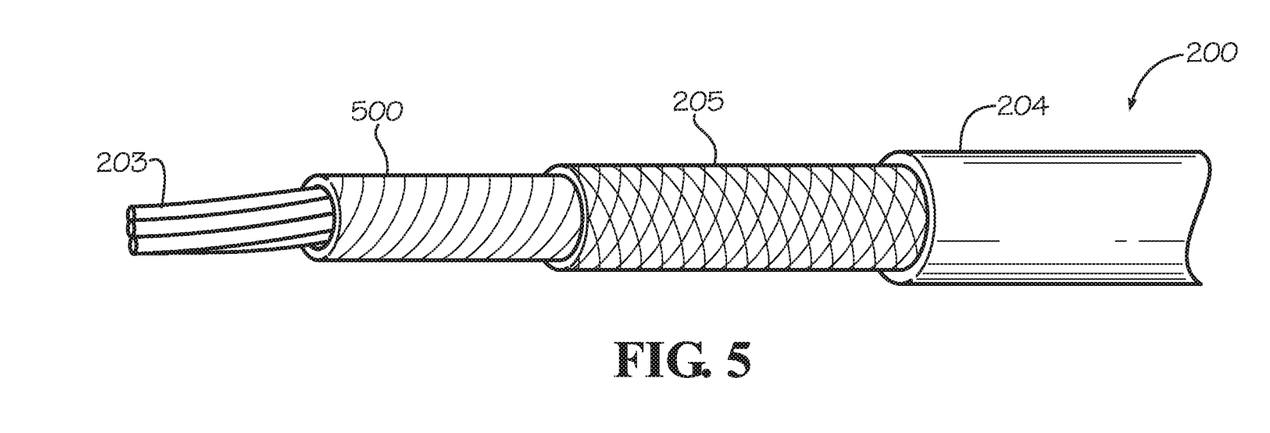
FIG. 5 is a cutaway perspective view of a piezoelectric cable in accordance with one aspect of the present disclosure.

FIG. 5 shows one aspect of the piezoelectric cable 200. The piezoelectric cable 200 in FIG. 5 is a coaxial cable and comprises the inner conductive layer 206, a piezoelectric material layer 500, the outer conductive layer 205, and the jacket 204. The piezoelectric material layer 500 circumferentially surrounds and contacts the inner conductive layer 206, which is a center core comprising 20 AWG stranded silver-plated copper wire. The outer conductive layer 205 is a copper braid and circumferentially surrounds and contacts the piezoelectric material layer 500. The jacket 204 is extruded high-density polyethylene and circumferentially surrounds and contacts the outer conductive layer 205, though other nonconductive materials can be used to form the jacket 204. The piezoelectric material layer 500 can partially circumferentially surround or be adjacent to the inner conductive layer 206 in other aspects, and the outer conductive layer 205 can partially circumferentially surround or be adjacent to the piezoelectric material layer 500 in other aspects. The outer conductive layer 205 and inner conductive layer 206 can comprise other conductive materials or combination of materials at various to allow electrical conduction through the piezoelectric cable 200 in other aspects.

The piezoelectric material layer 500 in FIG. 5 comprises polyvinylidene difluoride ("PVDF") piezo film tape. Two adjacent pieces of the tape are spiral-wrapped around the inner conductive layer 206, and the outer conductive layer 205 surrounds the tape. The inner conductive layer 206, the piezoelectric material layer 500, and the outer conductive layer 205 are thereby all in electrical communication with each other.

Figure 6:
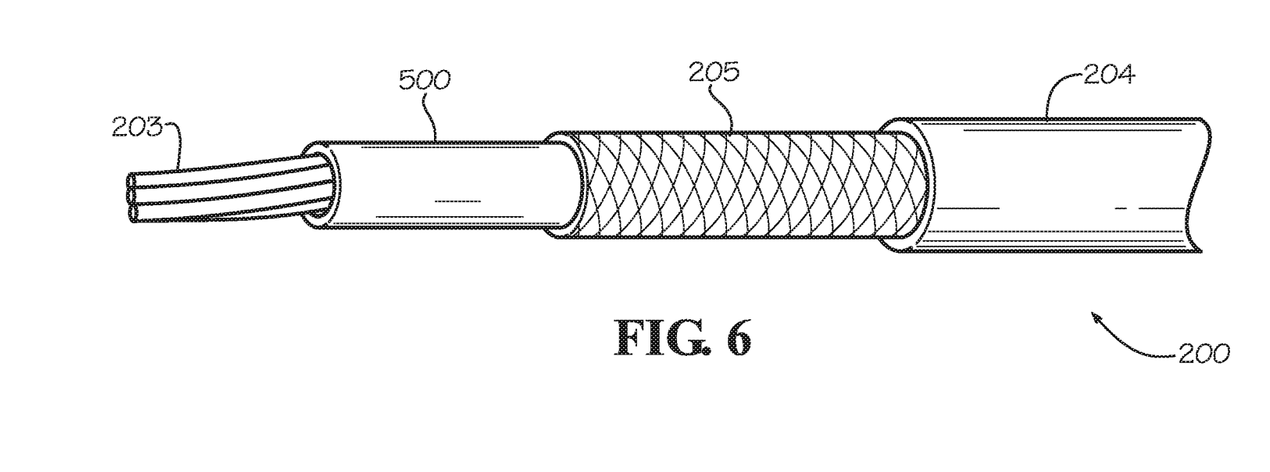
FIG. 6 is a cutaway perspective view of a piezoelectric cable in accordance with another aspect of the present disclosure.

FIG. 6 shows another aspect of the piezoelectric cable 200. The piezoelectric cable 200 of FIG. 6 is similar to the piezoelectric cable 200 of FIG. 5 except that the piezoelectric material layer 500 is a piezo PVDF copolymer that is extruded directly onto and around the inner conductive layer 206 and then surrounded by the outer conductive layer 205. The copolymer can be polarized. In various other aspects, the piezoelectric material layer 500 can comprise any other piezoelectric material that can generate a charge or a voltage, including but not limited to copolymers and terpolymers of PVDF and piezoelectric crystals.

Figure 7A:
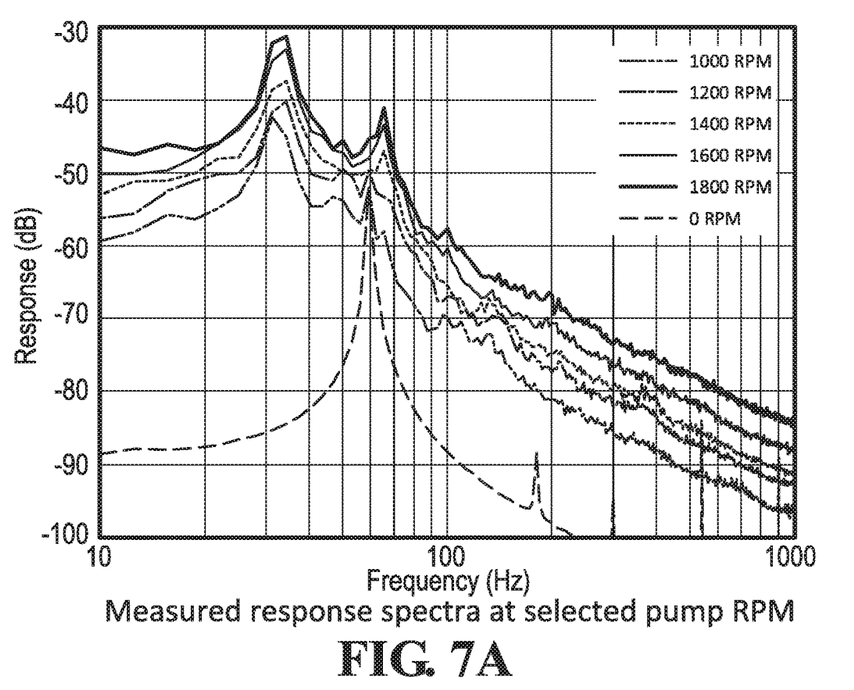
FIG. 7A is a graph showing response spectra at selected pump RPM for the flow sensor of FIG. 1.
Figure 7B:
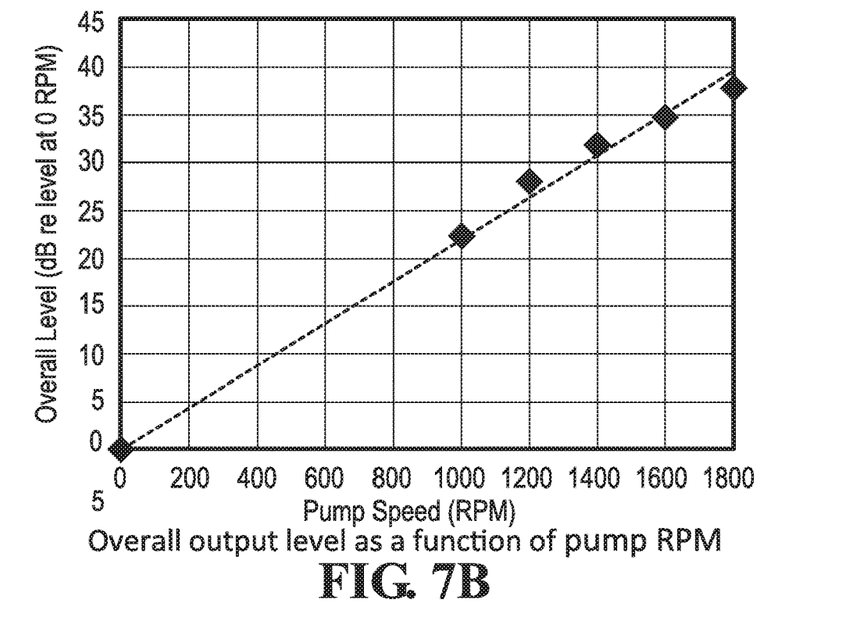
FIG. 7B is a graph showing a sensor output as a function of pump RPM for the flow sensor of FIG. 1.
Figure 7C:
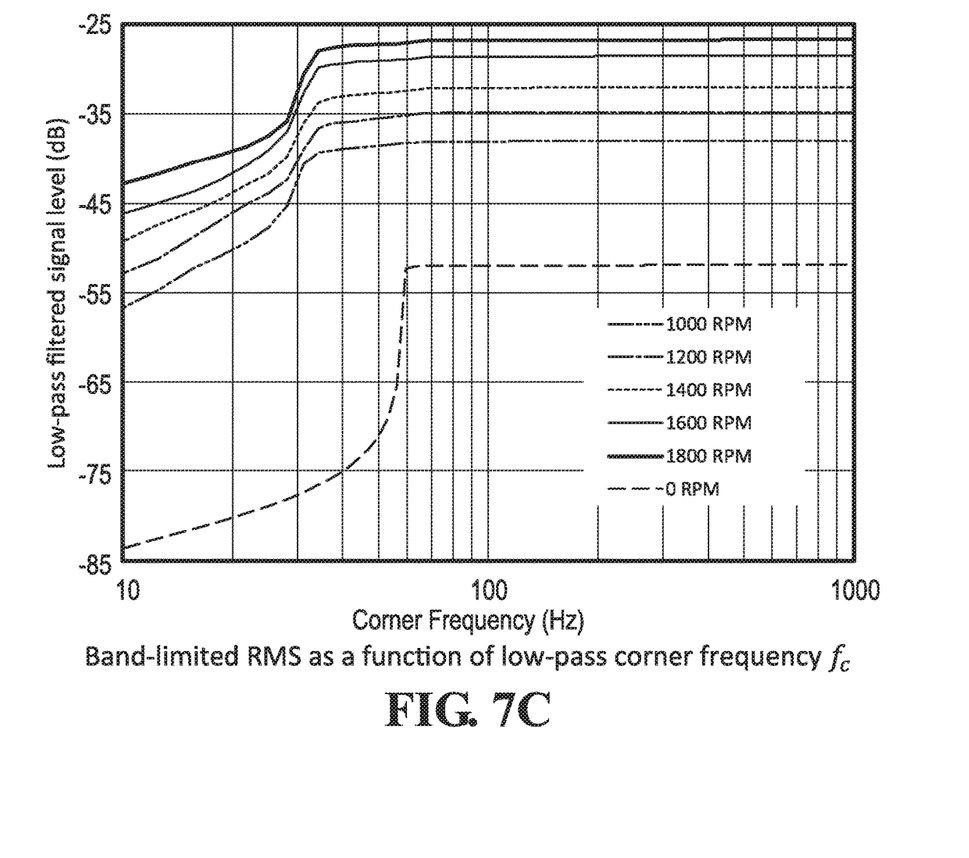
FIG. 7C is a graph showing band-limited root means square ("RMS") levels at selected pump RPM for the flow sensor of FIG. 1.

FIG. 7A shows a graph illustrating the response of the flow sensor 100 of FIG. 1 at various pump RPM during testing of the flow sensor 100 in a fluid system. As shown in FIG. 7A, the first harmonic, or peak, at each RPM is around 35 Hz. FIG. 7B shows a graph illustrating the overall spectrum levels as a function of the pump speed. As shown in FIG. 7B, the spectrum levels appear to scale with the pump RPM. FIG. 7C illustrates the effect of band-limiting the root mean square ("RMS") levels and shows that the RMS levels scale with the pump RPM. As shown in FIG. 7C, the optimum low pass-filter setting for all of the pump RPM is in the range of 30 Hz to 40 Hz, which coincides with the beam natural frequency. The flow sensor 100 of FIG. 1 thereby is able to determine the rate of flow within the fluid system.

In one aspect, the flow sensor 100 can be installed in a pipe system by tapping a sensor hole 402 from the exterior surface 301 of the pipe 300 to the interior surface 401 of the pipe 300. It is contemplated that the sensor hole 402 can be formed by known tapping methods such as the use of a ball valve, or a similar valve, and a drill mounted on the pipe wall saddle 310 to drill the sensor hole 402 through the ball valve, or can be pre-formed prior to mounting the pipe wall saddle 310. In various aspects, use of a ball valve mounted on the pipe wall saddle 310 allows the flow sensor 100 to be mounted on the pipe wall saddle 310 after the ball valve is closed and the drill is removed. The flow sensor 100 can thereafter be inserted into the sensor hole 402 after the ball valve is opened to expose the flow sensor 100 to the fluid within the pipe 300. Optionally, the sensor hole 402 can be formed on other pipe elements in the pipe system, including but not limited to valves, elbows, joints, hydrants, and meters, and, as one skilled in the art will appreciate, the flow sensor 100 can thereby be installed on any of these pipe elements in various other aspects.

In a further aspect, the pipe wall saddle 310 can be mounted to the exterior surface 301 of the pipe 300 by placing the neck 312 over the sensor hole 402 and tightening the fasteners 307*a,b*, placing the first saddle segment 305 and the second saddle segment 306 into sealing engagement with the exterior surface 301. It is also contemplated that the external member 110 of the flow sensor 100 can then be inserted into the sensor hole 402 and coupled to the pipe wall saddle 310 such that a portion of the external member 110 extends into the interior 400 of the pipe 300, thereby placing the portion of external member in the operative positon across a flow path of fluid within the pipe system. In this aspect, the flow sensor 100 can be coupled to the pipe wall saddle 310 by engaging the external threading on the hex bushing 122 with the complementary internal threading of the saddle hex bushing 311.

In yet another aspect, a measuring device, such as a voltmeter or any other device configured to measure a charge or a voltage, can be operably and/or electrically coupled to the RCA connector 140. Thus, as fluid flows across the external member 110, the external member 110, tube 210, and piezoelectric cable 200 can vibrate as a result of the impact of the fluid flowing in the pipe and impacting the external surface of the external member 110. The vibrations sympathetically flexes the piezoelectric material layer 500 in the piezoelectric cable 200, which causes the piezoelectric material layer 500 to generate a voltage due to the piezoelectric effect. The voltage is transmitted through the piezoelectric cable 200 to the RCA connector 140 and then to the measuring devices, thereby measuring a voltage output of the flow sensor 100. In other aspects, the measuring device can measure a charge output from the piezoelectric material layer 500. Optionally, the stiffening sleeve 130 can be configured to prevent flexure of the portion of the piezoelectric cable 200 between the RCA connector 140 and the mounting adapter 120 during use of the flow sensor 100, thereby preventing interruptions in the output of the piezoelectric material layer 500.

In a further aspect, by measuring an output from piezoelectric cable 200, the flow sensor 100 is capable of detecting a change in flow of the fluid in the pipe 300. For example, during a pipe burst situation either downstream or upstream of the flow sensor 100, the rate of fluid flow in the pipe changes. In this instance, the vibration frequency of the flow sensor 100 would change to a different frequency as a result of the change in the fluid flow, which would cause a change in output from the piezoelectric cable 200, which can be detected by the measuring device. In this aspect, the change in output can trigger a warning or alert in the measuring device, which, optionally, can be communicated to monitoring system, or the measuring device can communicate the voltage or charge output to the monitoring system to monitor the output and generate the warning or alert. In various aspects, the warning or alert can be in the form of a siren, light, text or email message, or any other communication that indicates a change in flow or a possible pipe burst. In various aspects, multiple flow sensors 100 can be utilized, with at least one flow sensor 100 detecting acoustics within the pipe system and at least one flow sensor 100 detecting flow rates, which can then be compared to detect and confirm a burst or leak. In various aspects, multiple flow sensors 100 can be utilized to determine a location of a burst or leak by cross-correlating the sensor outputs.

In a further aspect, the charge or voltage output from the flow sensor 100 can be used to monitor an approximate flow rate of the fluid in the pipe 300. In this aspect, it is contemplated that the output can be correlated to specific flow rates based on the dimensions and other characteristics of the flow sensor 100, the size and material of the pipe, the type and temperature of the fluid, and any other factors affecting the relationship between the output and the fluid flow rate.

In another aspect, the external member 110 can be a housing for the tube 210 and the piezoelectric cable 200. In an exemplary aspect, the external member 110 can comprise brass or other like materials suitable for use in potable water, which allows the flow sensor 100 to be used in a potable water distribution system. One skilled in the art will also appreciate that the flow sensor 100 also requires little to no power during use, as the signal is generated by the inherent properties of the piezoelectric cable 200.

In one aspect, it is contemplated that flow sensor 100 can be configured without use of the external member 110. In this aspect, the tube 210 can be a housing for the piezoelectric cable 200 that can be then be inserted into the flow path.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A flow sensor for a pipe, comprising:
   an external member defining an elongated interior void,
   a cylindrical housing defining an interior chamber, a distal end, and an open proximal end, wherein the distal end of the housing extends within the external member;
   a mounting adapter circumferentially coupled to the open proximal end of the housing; and
   a piezoelectric cable comprising:
      an inner conductive layer, a piezoelectric material layer at least partially circumferentially surrounding and contacting the inner conductive layer, an outer conductive layer at least partially circumferentially surrounding and contacting the piezoelectric material layer, a nonconductive jacket circumferentially surrounding and contacting the outer conductive layer, wherein:

a distal portion of the piezoelectric cable extends within the interior chamber of the housing, the flow sensor is configured to maintain a constant resonance frequency between about 25 Hz and about 40 Hz regardless of a flow rate of fluid through the pipe, the flow sensor is configured to output a band-limiting decibel level in a frequency range coinciding with a beam natural frequency of the flow sensor, and the decibel level is proportional to the flow rate.

2. The flow sensor of claim 1, wherein the distal portion of the piezoelectric cable is embedded within the interior chamber of the housing.

3. The flow sensor of claim 1, wherein an outer surface of the member defines a rectangular cross-section.

4. The flow sensor of claim 3, wherein the external member defines a square cross-section and the external member comprises a rigid material.

5. The flow sensor of claim 4, wherein the external member comprises brass.

6. The flow sensor of claim 1, wherein an outer surface of the member defines a uniform geometric cross-section.

7. The flow sensor of claim 1, wherein an outer surface of the housing is textured.

8. The flow sensor of claim 1, wherein a distal end of the housing is closed; and wherein a distal end of the piezoelectric cable is positioned proximate the distal end of the housing.

9. The flow sensor of claim 1, wherein the housing comprises acetal homopolymer.

10. The flow sensor of claim 1, wherein the piezoelectric material layer comprises a PVDF piezo film tape spiral-wrapped around the inner conductive layer.

11. The flow sensor of claim 1, wherein the piezoelectric material layer comprises a piezo PVDF copolymer extruded around the inner conductive layer.

12. The flow sensor of claim 1, wherein the outer conductive layer comprises a copper braid surrounding the piezoelectric material layer.

13. The flow sensor of claim 1, wherein the nonconductive jacket is a polyethylene jacket.

14. The flow sensor of claim 1, wherein the inner conductive layer comprises stranded silver-plated copper wire.

15. The flow sensor of claim 1, wherein the piezoelectric cable comprises a coaxial cable, and wherein the inner conductive layer comprises a center core.

16. The flow sensor of claim 1, further comprising an RCA connector attached to a proximal end of the piezoelectric cable.

17. The flow sensor of claim 16, further comprising a stiffening sleeve extending from the RCA connector to the mounting adapter, a portion of the piezoelectric cable extending through the stiffening sleeve from the mounting adapter to the RCA connector.

18. The flow sensor of claim 1, further comprising a pipe wall saddle, the mounting adapter mounted on the pipe wall saddle, the pipe wall saddle comprising a first saddle segment, a second saddle segment, and a pair of nut-and-bolt fasteners, the pair of nut-and-bolt fasteners coupling the first saddle segment and the second saddle segment together at respective ends of the first saddle segment and the second saddle segment, the first saddle segment and the second saddle segment configured to surround the pipe when coupled together.

19. A method for detecting fluid flow in a pipe system, the method comprising:

tapping a sensor hole from an exterior surface of a pipe element of the pipe system to an interior surface of the pipe element;

inserting a flow sensor into the sensor hole, the flow sensor comprising: i) a cylindrical housing defining an interior chamber and ii) a piezoelectric cable comprising an inner conductive layer, a piezoelectric material layer at least partially circumferentially surrounding and contacting the inner conductive layer, an outer conductive layer at least partially circumferentially surrounding and contacting the piezoelectric material layer, and a nonconductive jacket circumferentially surrounding and contacting the outer conductive layer, wherein a distal portion of the piezoelectric cable extending within the interior chamber of the housing;

positioning a portion of the housing of the flow sensor across a flow path of a fluid within the pipe system;

vibrating the flow sensor with fluid flow within the pipe system; and measuring an output from the piezoelectric cable of the flow sensor, the output comprising a charge or a voltage, the output defining a band-limiting decibel level in a frequency range coinciding with a beam natural frequency of the flow sensor, wherein the decibel level is proportional to a flow rate of fluid flow within the pipe system, the output further defining a constant resonance frequency between about 25 Hz and about 40 Hz regardless of the flow rate of fluid flow within the pipe system.

20. The method of claim 19, further comprising:

mounting a pipe wall saddle to an exterior surface of the pipe element; and coupling a portion of the flow sensor to the pipe wall saddle so the housing extends substantially transverse to the fluid flow in the pipe element.

21. The method of claim 19, wherein the flow sensor further comprises an elongated external member having an inner surface that defines an elongated interior void, wherein the interior void of the member is configured to operatively receive the housing such that at least a portion of an outer surface of the housing is positioned in contact with at least a portion of the inner surface of the member.

22. The method of claim 21, wherein an outer surface of the member defines a rectangular cross-section.

23. The method of claim 22, wherein the external member defines a square cross-section and the external member comprises a rigid material.

24. The method of claim 23, wherein the external member comprises brass.

25. The method of claim 19, further comprising determining if a flow rate of the fluid in the pipe system has changed by measuring a change in the output from the flow sensor.

26. The method of claim 25, further comprising communicating an alert if the flow rate of the fluid has changed.

27. The method of claim 19, further comprising determining a change in the fluid flow by detecting a change in a vibration frequency of the output.

* * * * *